Oct. 3, 1961  SHINTARO OSHIMA ET AL  3,003,030
TRANSMISSION CHARACTERISTIC COMPENSATION SYSTEM
Filed Sept. 12, 1955  12 Sheets-Sheet 1
*Fig. 1.*
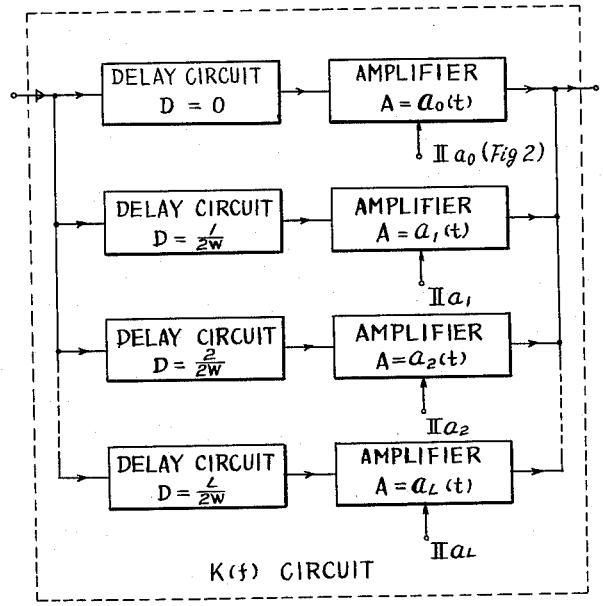
*Fig. 9.ᵈ*
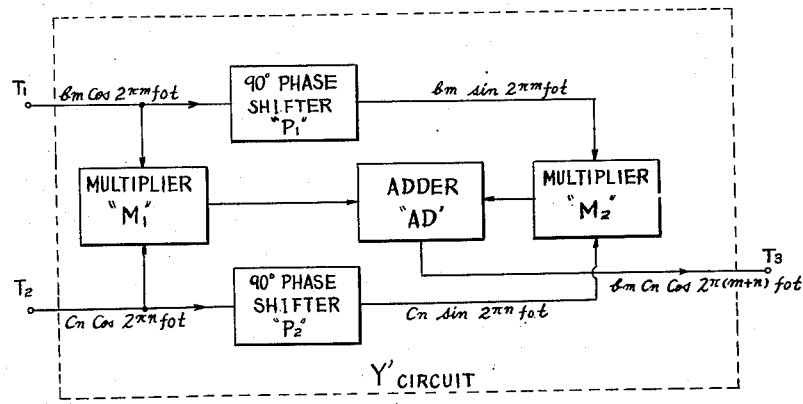
Inventors,
*Shintaro Oshima*
By *Hajima Enomoto,*
Wenderoth, Lind & Ponack
attys.

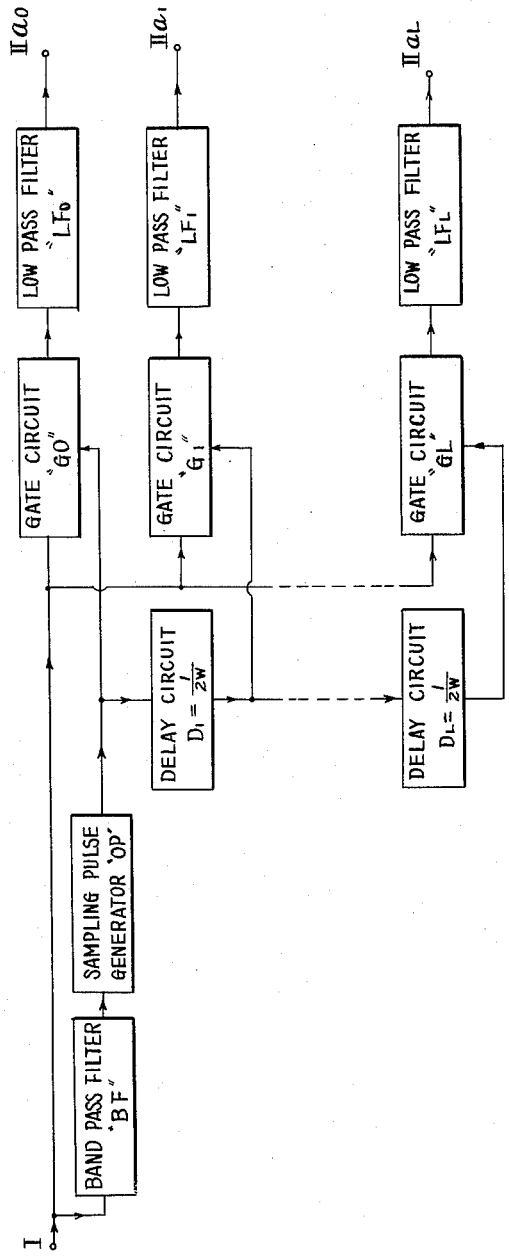
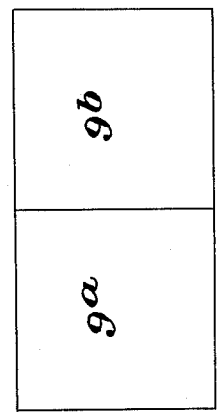

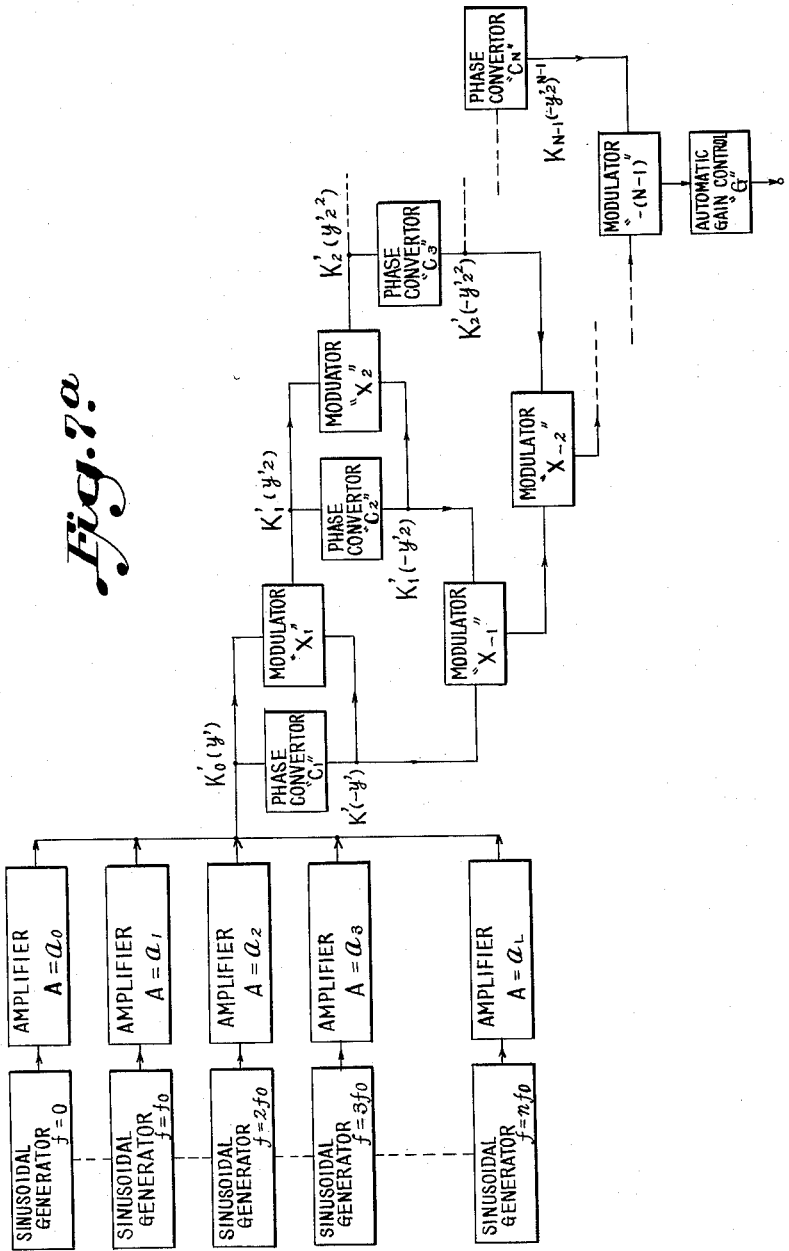

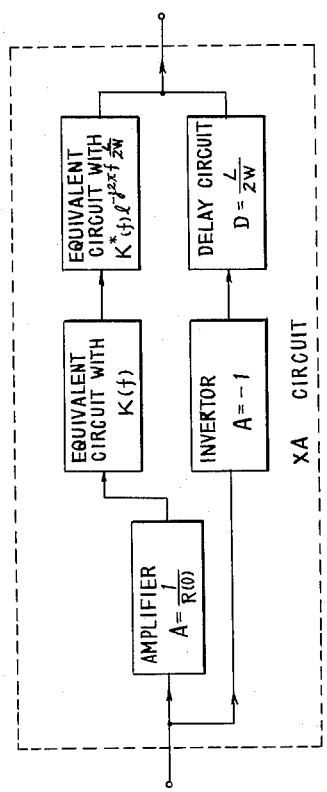
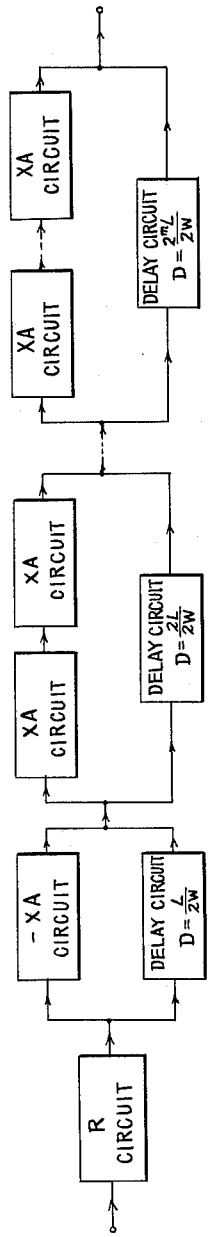

United States Patent Office 3,003,030
Patented Oct. 3, 1961

3,003,030
TRANSMISSION CHARACTERISTIC COMPENSATION SYSTEM
Shintaro Oshima, Musashino-shi, Tokyo-to, and Hajime Enomoto, Ichikawa-shi, Japan, assignors to Kokusai Denshin Denwa Co., Ltd., Tokyo, Japan, a Japanese company
Filed Sept. 12, 1955, Ser. No. 533,571
Claims priority, application Japan Sept. 18, 1954
6 Claims. (Cl. 178—69)

This invention relates to the transmission characteristic compensation system, and in particular, to the system compensating for the variation with time of transmission characteristics in the transmission path.

In the communication, it is desirable that the transmission charcteristics be uniform. However, by the medium in the communication path, such as cable in the case of wire communication, and, by the echo and the fading phenomena in the space in the case of wireless communication, the transmission characteristics are considerably varied, depending upon the frequency of communication. Furthermore, by the fading phenomenon, it occurs sometimes that the transmission characteristics are varied with time.

The object of the present invention is to provide a system compensating for the variation of transmission characteristics in the transmission path, as described above.

The principle of the invention and the features of the invention will be made clear by the detailed description made with reference to the attached drawings, in which:

FIG. 1 is the block diagram showing an equivalent circuit of network having frequency characteristics of limited band width;

FIG. 2 is the block diagram showing one embodiment of the measuring circuit of transmission characteristics varying with time, used for the invention;

Figure 10A:
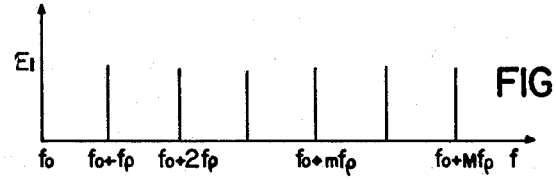
Figure 10B:
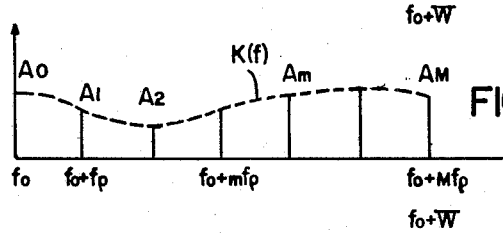
Figure 6:
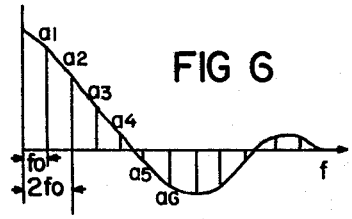
Figure 10C:
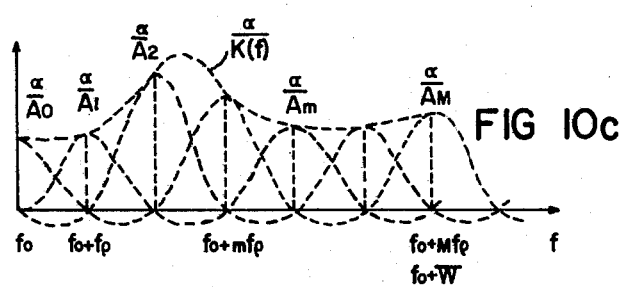
Figure 9B:
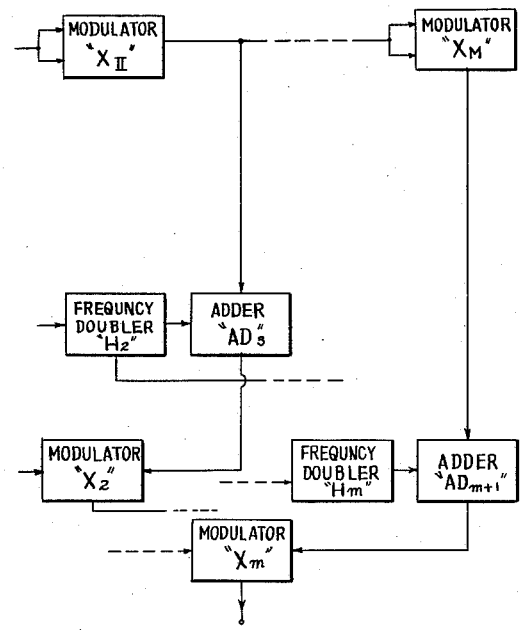
Figure 5:
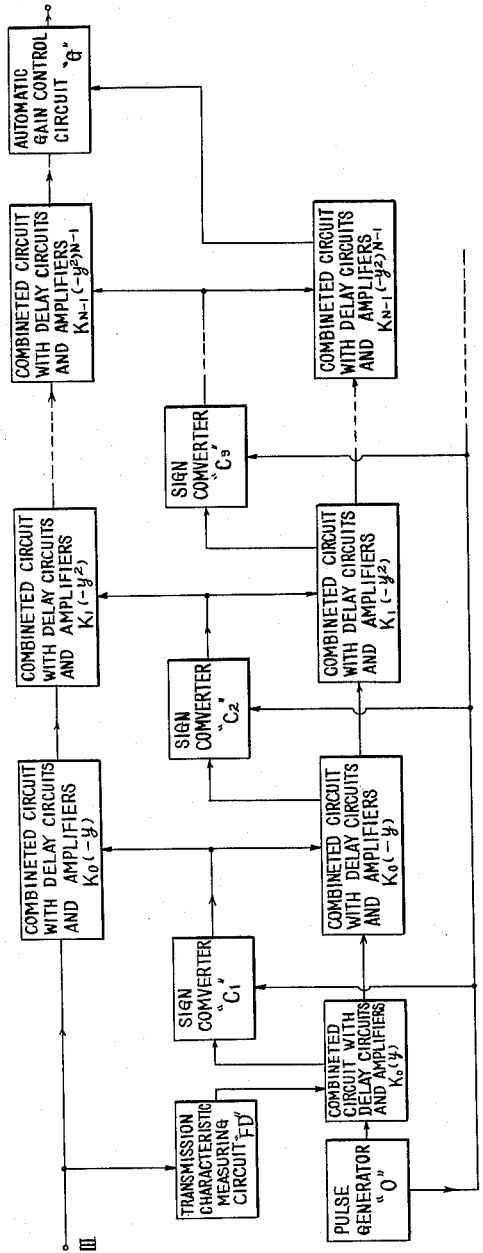
Figure 7B:
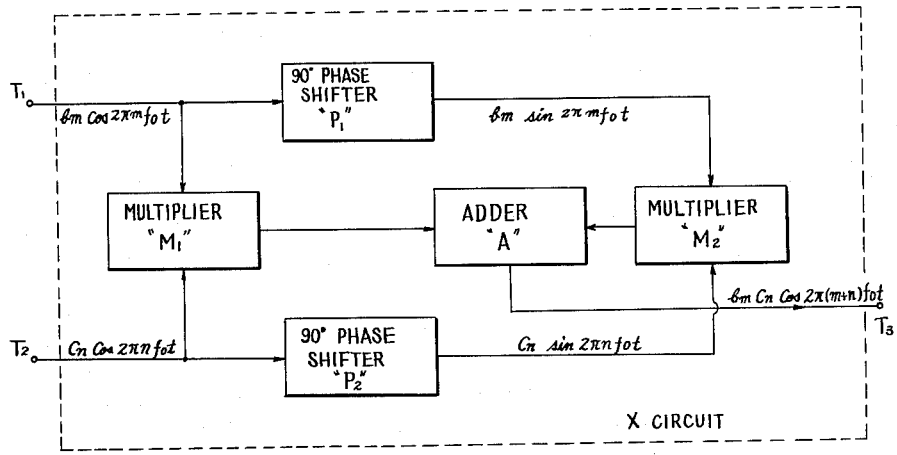
Figure 8A:
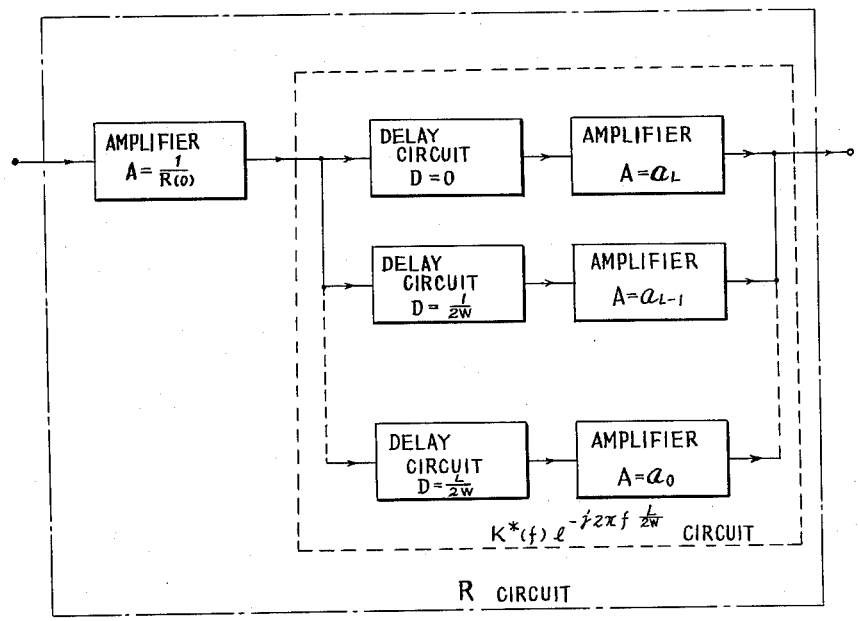
Figure 9A:
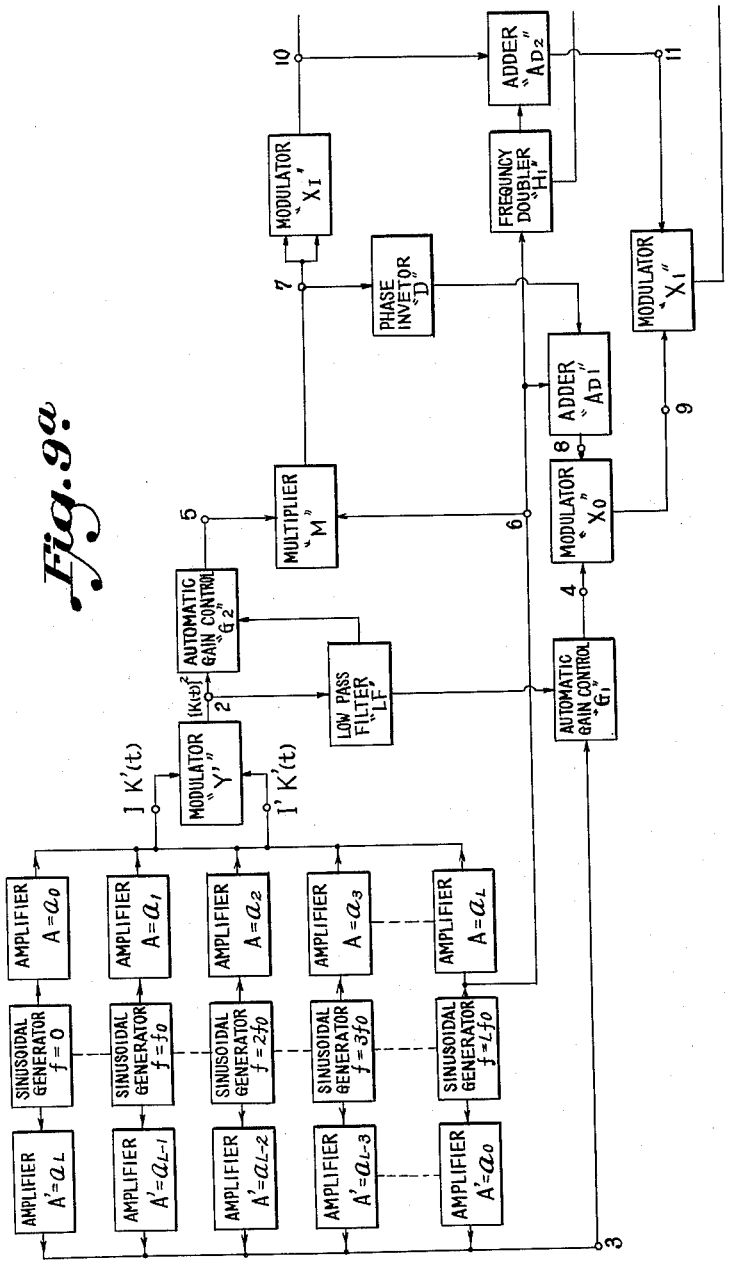
Figure 11:
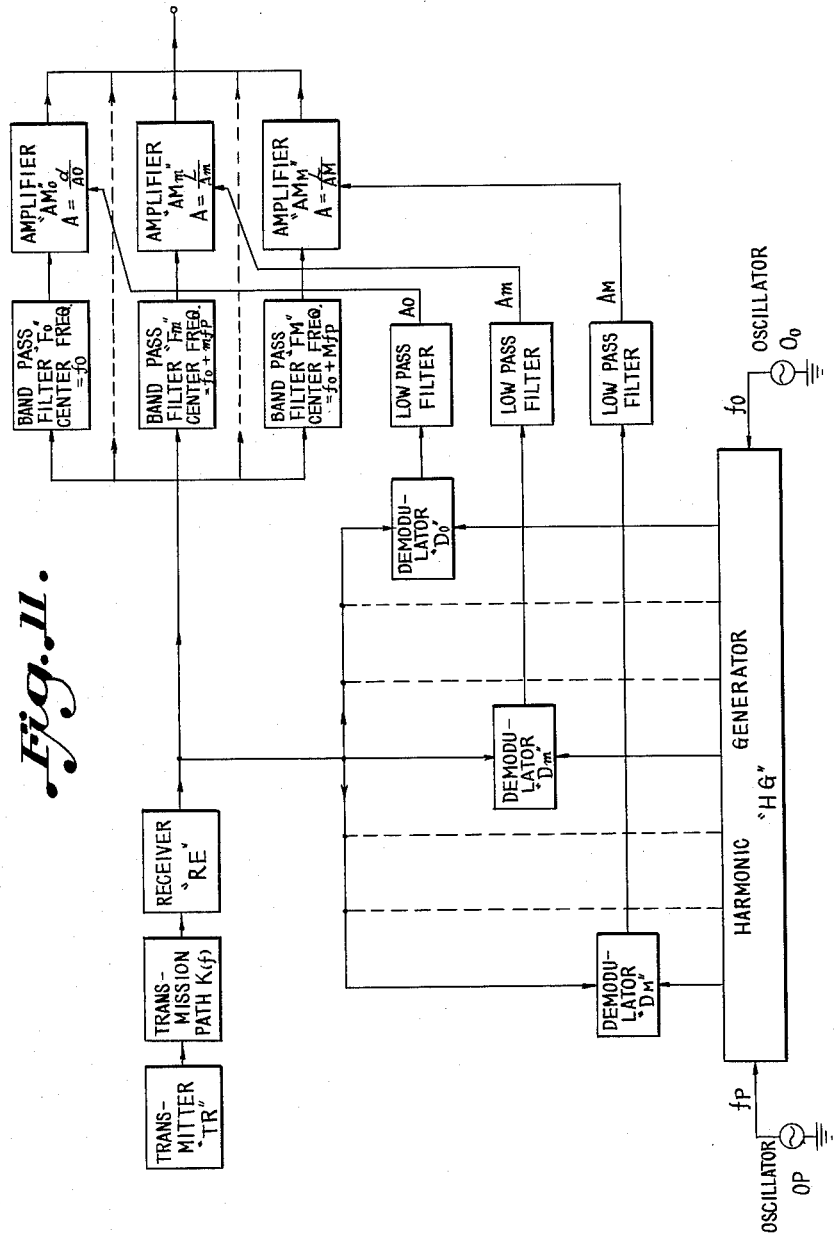
Figure 12:
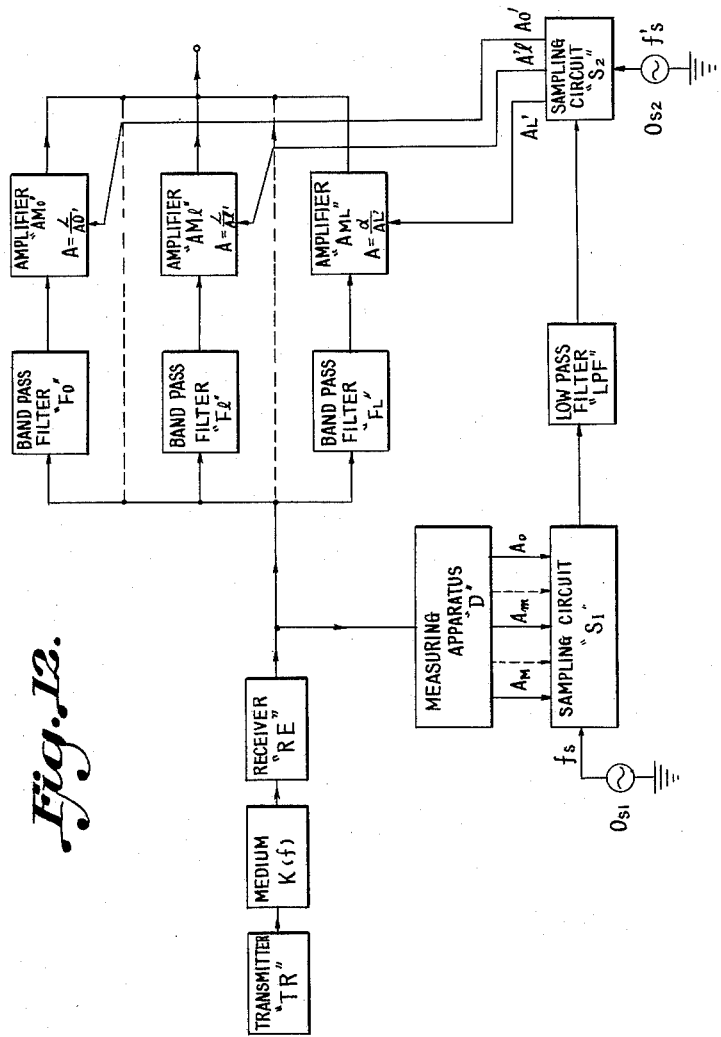
Figure 13A:
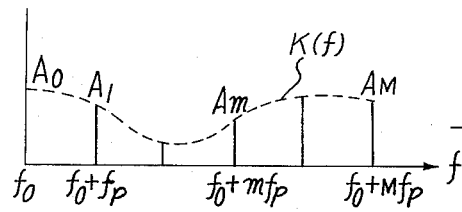

FIG. 5 and FIGS. 8a, b, c are the block diagrams showing the active inverse characteristic network, used for the invention;

FIG. 6 is the wave form, represented in the form of frequency spectrum, of the impulse response;

FIGS. 7a and 7b is the block diagram showing one embodiment of the computing circuit, used for the invention;

FIGS. 9a, b, c and d are the block diagrams showing another embodiment of the computing circuit;

FIGS. 10 a, b, c and FIGS. 13a, b, c, d, e show the frequency spectrum for explaining the principle of the invention; and FIGS. 11 and 12 are the block diagrams showing another embodiment of the invention.

Generally speaking, when the input of a network (A transmission system is thought to be a network) is limited to the band width of W c./s., it is enough to consider the frequency characteristics (transmission characteristics) thereof also to the extent of W c./s. Also, the signal wave form, limited to W c./s., can be restored to its original wave form, by knowing the values thereof at every $$\frac{1}{2W}$$

second or less. And, the frequency characteristics of a network can be represented by the following formula, according to Shannon's theorem:

$$K(f) = a_0 + a_1 e^{-j2\pi f \frac{1}{2W}} + a_2 e^{-j2\pi f \frac{2}{2W}} + \ldots + a_L e^{-j2\pi f \frac{L}{2W}} \quad (1)$$

where, $K(f)$ represents the frequency characteristics of the network, of which the input is limited to the band width of W c./s.

Therefore, by sending pulses from one end of a network, by sampling and measuring, at every $$\frac{1}{2W}$$

second, the received amplitude at the other end (the pulse wave form is deformed depending upon the frequency characteristics of the network, when received) and by obtaining the sampled impulse response, $a_i$ (where $i$ is 0, 1, 2 . . . L), the equivalent circuit or network, of which the input is limited to the band width of W c./s., can be represented in FIG. 1, as connection in parallel or series circuits made of the delay circuit and the amplifying circuit, said delay circuit having delay time, $$D = \frac{i}{2W}$$

and said amplifying circuit having the amplitude, $A = a_i$, equivalent to the sampled impulse response, $a_i$. The high frequency signal of the band width W c./s., carried on the carrier frequency, may be beaten down to low frequency band, and taken as transmitting signal limited to the band width of W c./s. Then, its transmission system can be substituted by the equivalent circuit shown in FIG. 1. When the transmission characteristics are varied with time, as in the case of fading, the sampled impulse response, $a_i$ varies with time, and therefore, the amplification factor A of each amplifier of the equivalent circuit in FIG. 1 can be considered as varying in response to the sampled impulse response, $a_i$.

Therefore, for measuring transmission characteristics, it is enough to measure the impulse response of the transmission system. For this purpose, the pulses are sent from the transmission side, as shown in FIG. 3a, and the wave form of the received pulses is sampled at every $$\frac{1}{2W}$$

second. The sampled wave form is represented as $a_0$, $a_1$, $a_2$, . . ., and can be measured easily Braun tube oscillograph.

Figure 3A:
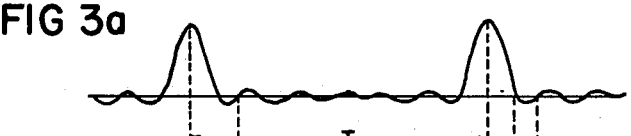
FIGS. 3a to 3e show the wave form for obtaining the impulse response.
Figure 3B:
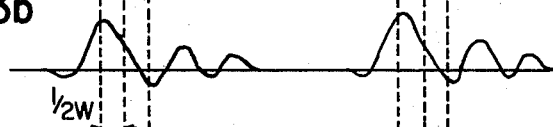
Figure 3C:
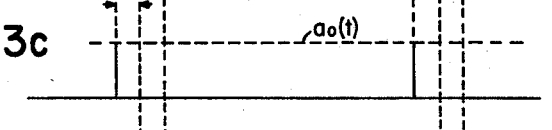
Figure 3D:
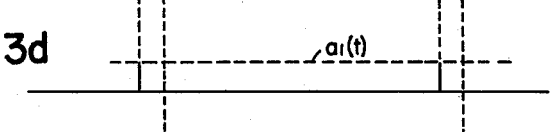
Figure 3E:
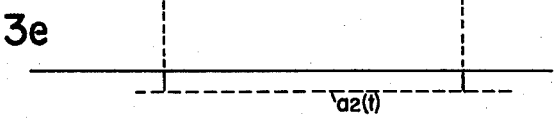

In case the transmission characteristics are varied with time, the method of measuring impulse response suitable for working servo system is as follows:

The measuring pulses, as shown in FIG. 3a, are transmitted from the transmission side at every period $T_p$ ($T_p$ has a duration of time larger than that of impulse response). Such pulses are received at the receiving side, and after having been demodulated to low frequency band, one part of the output from the receiving side is applied to the transmission characteristics measuring circuit as shown in block diagram in FIG. 2. Namely, one part of the above output is applied to the input terminal I in FIG. 2. Then, the wave form of pulses transmitted from the transmitting side is deformed by the frequency characteristics of the transmission system, and is taken out in the wave form as shown in FIG. 3b. Then, such received wave form of measuring pulses is applied in parallel to each gate circuit, $G_0, G_1, G_2 \ldots G_L$. At the same time, the wave of fundamental frequency of sampled pulses is taken out through the band pass filter BF, and the pulse repeating period of the sampling pulse generator $O_p$ is synchronised to $T_p$. The pulse voltage of $O_p$, generating at every period $T_p$, is applied to the gate circuit $G_0$ directly, and the gates $G_1, G_2 \ldots G_L$ after having been passed through the delay circuits $D_1, D_2, \ldots$ $D_L$ successively, said $D_1, D_2 \ldots D_L$ having respectively delay time, $$\frac{1}{2W}$$

second. The gate circuits $G_0, G_1, G_2 \ldots G_L$ are opened by the pulses with delay time successively of $$\frac{1}{2W}$$

second from $G_0$, and the voltages sampled at every $$\frac{1}{2W}$$

second of the received wave form shown in FIG. 3b are taken out respectively at the period $T_p$ as shown in FIGS. 3c, d, e, ... The output of each gate circuit $G_0, G_1, G_2 \ldots G_L$ represents the intensity of sampled impulse response, $a_0, a_1, a_2 \ldots a_L$, at every instant. When each output taken out at the period $T_p$ is passed through the respective low pass filter $LF_0, LF_1 \ldots LF_L$, such output is taken out, at every output terminal, $II_{a0}, II_{a1}, II_{a2} \ldots II_{aL}$, as continuous wave form which is determined by $a_0, a_1, \ldots a_L$, as shown in broken lines in FIGS. 3c, d, and e. By this way, the frequency characteristics of the transmission path, varied with time due to fading etc., namely variation with time of the sampled impulse responses, $a_0, a_1, \ldots a_L$, can be continuously known. Therefore, if the amplification factor A of each amplifier of FIG. 1 is controlled by such sampled impulse responses, the frequency characteristics of the network can always be made equal to the transmission characteristics varied with time due to fading etc. of communication path.

The above description was given for the case of sending measuring pulses at each period $T_p$, for the convenience of explanation. It is, of course, possible to send simultaneously measuring voltages having a definite amplitude of every $$\frac{1}{T_p} c./s.$$

interval, to take out such voltages by the narrow band pass filter at the receiving side, and to measure impulse response of transmission path.

Now, assuming that, when a circuit having the frequency characteristics $K_c(f)$ is connected in series to a network having the frequency characteristics $K(f)$ the flat frequency characteristics having a delay time $\tau$ is obtained, the relation between the two frequency characteristics $K(f)$ and $K_c(f)$ will be represented by the following formula:

$$K(f) \cdot K_c(f) = e^{j2\pi f \tau}$$

As mentioned above, if we can make a network having frequency characteristics $K_c(f)$ which satisfies the Formula 2 (hereinafter referred to as "inverse characteristic network"), the frequency characteristics of transmission path being taken as $K(f)$, we can compensate for such frequency characteristics of the transmission path, by connecting in cascade the above network to the transmission path. Furthermore, in the wireless communication, if we can so control the frequency characteristics $K_c(f)$ of the inverse characteristic network as to satisfy always the Formula 2, in response to the variation with time of the frequency characteristics $K(f)$ of the transmission path (the transmission path shall include the space) due to fading etc., we may be able to compensate satisfactorily for such variation with time of the transmission characteristics.

In case transmission characteristics are not varied with time, the sampled impulse responses, $a_0, a_1, a_2 \ldots$ are measured, and the transmission characteristics $K(f)$ are measured thereby, and a network having characteristics $K_c(f)$ is formed so as to satisfy the Formula 2, and is connected in cascade in the transmission path. The transmission characteristics are completely compensated for.

Figure 4:
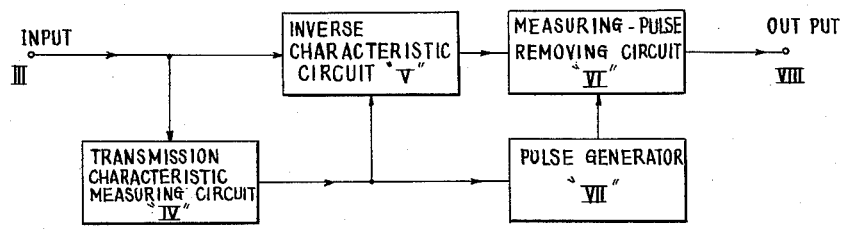
FIG. 4 is the block diagram showing one embodiment of the invention.

The present invention is based on the above principle. From the transmission side, measuring pulses are sent at every period of $T_p$ seconds, together with information signal. These are received by the receiver, and the output of the receiver is introduced to the input terminal III shown in FIG. 4 as block diagram. Such output introduced to III is then introduced to the inverse characteristic network V (such circuit will be described later), and at the same time, one part thereof is led to the transmission characteristic measuring circuit IV as shown in FIG. 2. By measuring the impulse response $a_i$ in the transmission path at every $$\frac{1}{2W}$$

second, we can know the frequency characteristics in the transmission path and their variation with time. Then, by controlling the frequency characteristics $K_c(f)$ of the inverse characteristic network V by such impulse response $a_i$, so as to satisfy the Formula 2, the variation with time of the frequency characteristics in the transmission path is compensated for, and the information signal sent from the transmission side is taken out at the output side of V, without being deformed.

In this case, the measuring pulses, sent from the transmission side, are taken out, besides the signal output. And, since such measuring pulses have the time delay $\tau$, only the reproduced wave form of signal is taken out at the output terminal VIII, if we take out a part of the output of the sampling pulse generator $O_p$ in the transmission characteristic measuring circuit IV, control thereby the repeating frequency and phase of the pulse generator VII for removing measuring pulses, apply the output of the pulse generator VII to the measuring-pulse-removing-circuit VI, and remove the measuring pulses from the output of the network V.

Although it is difficult to make the above inverse characteristic network by passive network formed by combining circuit elements, it is possible to make any desired characteristic circuit required, by active network. Hereunder, we shall explain the method of making inverse characteristic network with active network, for the case in which the transmission characteristics are varied with time, due to fading etc.

In case no variation with time is caused, we have only to fix, at values computed in advance, each gain of the amplifier which are included in the circuit for making the characteristics $K_c(f)$ connected in the transmission system, without using a computing device.

FIG. 5 is a block diagram showing one example of the active inverse characteristic network for practising the present invention. III is the input terminal which corresponds to I in FIG. 2 and III in FIG. 4; FD is the transmission characteristic measuring circuit as shown by IV in FIG. 4, namely in FIG. 2; and $K_0(y)$ is the equivalent circuit to the frequency characteristics $K(f)$ of the transmission path. The said equivalent circuit has been explained hereinabove with reference to FIG. 1.

As explained on FIG. 2, the measuring pulses sent from the transmission side at the period $T_p$ are taken out at every $$\frac{1}{2W}$$

second; the impulse responses of the Formula 1, $a_0, a_1, a_2 \ldots a_L$, are measured; and the frequency characteristics $K(f)$ of the transmission path varying with time due to fading etc. are obtained. At the same time, each value $a_0, a_1, a_2 \ldots a_L$ is introduced to the circuit $K_0(y)$ and is controlled so that the amplification factor A of each amplifying circuit will be $a_0, a_1, a_2 \ldots a_L$. By this way, the frequency characteristics of the circuit $K(y)$ can always be made equal to the frequency characteristics $K(f)$ of the transmission path. Then, pulses are impressed on the circuit of $K_0(y)$ from the pulse generator O (which sends out pulses at the same period as measuring pulses coming from the transmission side). One part of the output of O is applied to the sign converter $C_1$, and the amplitude thereof is taken out at every $$\frac{1}{2W}$$

second by the pulse generator O which controls the time interval. At the same time, the polarity of every odd-numbered pule is reversed, and the amplification factor $A=a_1$ of each amplifier in the two circuits (one is connected to the input terminal III, and the other to the circuit of $K(y)$) is controlled just like the circuit of $K(y)$ in FIG. 1, thereby making an equivalent circuit in which the amplification factor at every odd numbered pulse is made minus, $K(-y)$. By this way, when put, $$e^{-j2\pi f \frac{1}{2W}} = y \qquad (3)$$

in the Formula 1, the frequency characteristics of the circuits, $K_0(y)$ and $K_0(-y)$, are respectively represented by the following formula which is algebraic equation of Lth order, and assuming the L roots respectively as $y_1, y_2 \ldots y_L$, the following formulae are given:

$$K_0(y) = a_0 + a_1 y + a_2 y^2 + \ldots + a_L y^L$$
$$= a_L(y-y_1)(y-y_2) \ldots (y-y_L) \qquad (4)$$

$$K_0(-y) = a_0 - a_1 y + a_2 y^2 - a_3 y^3 + \ldots + (-1)^L a_L y^L$$
$$= (-1)^L a_L(y+y_1)(y+y_2) \ldots (y+y_L) \qquad (5)$$

Now, if the circuit $K_0(y)$ and the circuit $K_0(-y)$ are connected in series, the resultant frequency characteristics are represented as follows:

$$K_1(y^2) = K_0(y) \cdot K_0(-y)$$
$$= (-1)^L a_L^2 (y^2-y_1^2)(y^2-y_2^2) \ldots (y^2-y_L^2)$$
$$= b_0 + b_1 y^2 + b_2 y^4 + \ldots + b_L y^{2L} \qquad (6)$$

The above Formula 6 shows that every other one of sampled impulse responses at every $$\frac{1}{2W}$$

second of $K_0(y)$ is eliminated by $K_0(-y)$. Therefore, if the pulse wave form of the pulse generator O, which passed through the circuit $K_0(y)$, is further applied to the circuit $K_0(-y)$, the output wave form thereof will be the same as that which passed through the circuit having frequency characteristics represented by the Formula 6. Then, the amplitude of the output of circuit $K_0(-y)$ is taken out, through the sign converter $C_2$, at every $$\frac{2}{2W}$$

second in the same way as above-mentioned; the polarity thereof at every odd number is reversed; each amplification factor $A=b_1$ of $K_1(-y^2)$ circuit connected to each $K_0(-y)$ circuit is controlled by $C_2$. (The circuit is made in a similar way as in FIG. 1, but the delay time of the delay circuit is $$D = \left(\frac{2i}{2w}\right)$$

The equivalent circuit having frequency characteristics $K_1(-y^2)$ is made thereby, and the three circuits, $K_0(y)$, $K_0(-y)$ and $K_1(-y^2)$ are connected in cascade. The resultant frequency characteristics are:

$$K_2(y^{2^2}) = K_1(y^2) K_1(-y^2) \qquad (7)$$

The same operation is repeated N times, and the circuits, $$K_0(y), K_0(-y), K_1(-y^2) \ldots K_{N-1}(-y^{2^{N-1}})$$

are connected in cascade. We can obtain the frequency characteristics represented by:

$$K_N(y^{2^N})$$
$$= A_L(y^{2^N} - y_1^{2^N})(y^{2^N} - y_2^{2^N}) \ldots (y^{2^N} - y_L^{2^N})$$
$$= C_0 + C_1 y^{2^N} + C_2 y^{2 \cdot 2^N} + C_3 y^{3 \cdot 2^N} + \ldots + C_L y^{L 2^N} \qquad (8)$$

Assuming the absolute values $y_i$ of $m$ roots ($m<L$, L being number of roots in Equation 4) are $|y_i|<1$, and those of $L-m$ roots are $|y_i|>1$, and taking N large enough to enable us to neglect the root $|y_i|<1$ with regard to $|y_i|>1$, the Formula 8 will be represented as:

$$K_N(y^{2^N}) \doteq C_m y^{m 2^N} \qquad (9)$$

Then, by the automatic gain regulation, we made $C_m = 1$, and the following formula is derived from the Formula 3:

$$K_N(y^2) \doteq e^{-j2\pi f \frac{m 2^N}{2W}} \qquad (10)$$

This formula is the same as the Formula 2 in which the delay time $\tau$ is taken as definite value $$\frac{m 2^N}{2W}$$

Therefore, $K_c(f)$ in Formula 2 is represented approximately as $$K_c(f) \doteq K_0(-y) K_1(-y^2) \ldots K_{N-1}(-y^{2^{N-1}}) \qquad (11)$$

Also, in case the transmission path having frequency characteristics $K(f)$ is connected in series with the circuits $$K_0(-y), K_1(-y^2) \ldots K_{N-1}(-y^{2^{N-1}})$$

which are connected in cascade and connected to the input terminal III of the transmission path, the resultant frequency characteristics will be $$C m y^{m 2^N}$$

represented by the Formula 9. If the automatic gain control apparatus G is connected at the output side thereof, and if the output amplitude $Cm$ is regulated to be always 1, the flat frequency characteristics, $$e^{-2j\pi f \frac{m 2^N}{2W}}$$

having the delay time $$\frac{m 2^N}{2W}$$

are obtained, and the input signal wave form applied to the transmission path having frequency characteristics $K(f)$ is taken out at the output terminal IX, reproduced to the original wave form but delayed by $$\frac{m 2^N}{2W}$$

seconds.

In the above case, even when the transmission characteristics, namely the frequency characteristics $K(f)$, are varied due to fading etc., we can make the frequency characteristics $K_c(f)$, of the active inverse characteristic network, to satisfy always the Formula 2. This is done by sending measuring pulses from the transmission side at the period $T_p$ which is smaller than the period of fading, by continuously measuring the same at the receiving side in the transmission characteristic measuring circuit FD at the period synchronised to $T_p$, and by controlling automatically the amplification factor of each circuit $$K_0(y), K_0(-y), \ldots K_{N-1}(-y^{2^{N-1}})$$

and the automatic gain control apparatus by the sampled impulse response $a_1$, in response to the variation of frequency characteristics. Thus, the compensation can be made automatically for all the fading phenomena, such as synchronous fading and selective fading.

Based upon the same principle, we can make the inverse characteristic network V, by giving to the Formula 4 the impulse response $a_1$ measured at every $T_p$ period by the measuring circuit IV (FIG. 4), by making automatically the computation up to the Formula 11, and by regulating automatically the amplification factor of each amplifying circuit of the nework shown in FIG. 1. Or, we can represent, in the form of frequency spectrum as in FIG. 6, the impulse response $a_1$ measured by the measuring circuit IV, and represent the wave form with time thereof as real part in the formula:

$$K^1(t) = a_0 + a_1 e^{-j2\pi f_0 t} + a_2 e^{-j2\pi 2 f_0 t} + \ldots + a_L e^{-j2\pi L f_0 t} \quad (1')$$

When put $$y' = e^{-j2\pi f_0 t}$$

$K_0(y')$ is represented by:

$$K_0(y') = a_0 + a_1 y' + a_2 y'^2 + \ldots + a_L y'^L$$
$$= a_L(y' - y'_1)(y' - y'_2) \ldots (y' - y'_L) \quad (4')$$

and by reversing the phase of the 1st, 3rd, 5th ... terms in the above formula, we can obtain:

$$K_0(-y') = a_0 - a_1 y' + a_2 y'^2 - a_3 y'^3 + \ldots + (-1)^L a_L y'^L$$
$$= (-1)^L a_L (y' + y'_1)(y' + y'_2) \ldots (y' + y'_L) \quad (5')$$

In this case, we provide a group of synchronising pulse generators, $f = 0, f_0, 2f_0 \ldots Lf_0$, wherein $f$ is composed of sinusoidal generator, the frequency of which is $f$ as shown in FIG. 7a, and give the amplification factor, equal to each impulse response $a_0, a_1, a_2 \ldots a_L$, measured as above, to each amplifier A connected to each generator, whereby we obtain the resultant output thereof. Namely, we take out the wave form of $K(y')$ in Formula 4'. And, by reversing the phase of frequency components of odd times of $f_0$ in Formula 4', by a sign converter (composed of a band pass filter and a phase inverter, we can take out the wave form $K_0(-y')$.

In order to take out the wave form $$K_1(y'^2)$$

from the wave form of $K_0(y')$ and $K_0(-y')$, we use the computing circuit as shown in FIG. 7b. For making the explanation simpler, it is assumed that the $m$th term of $K(y')$ as $b_m y^m$, and the $n$th term of $K(-y')$ as $C_n y^n$. Then, for obtaining the product of the two:

$$(b_m y^m) \times (C_n y^n) = b_m C_n y^{m+n} \quad (12)$$

we have only to make computation so that the amplitude of the frequency component of $(m+n)f_0$ will be $b_m c_n$. By using the following formula:

$$b_m C_n \cos 2\pi(m+n)f_0 t$$
$$= b_m \cos 2\pi m f_0 t \times C_n \cos 2\pi n f_0 t -$$
$$b_m \sin 2\pi m f_0 t \times C_n \sin 2\pi n f_0 t \quad (13)$$

we can represent $b_m y^m$ as wave form of $b_m \cos 2\pi m f_0 t$, and $c_n y^n$ as that of $c_n \cos 2\pi n f_0 t$. We introduce the same to the two input terminals $T_1$ and $T_2$ in FIG. 7b, and by applying one part of each input wave form to the multiplier $M_1$, we take out the output:

$$b_m \cos 2\pi m f_0 t \times C_n \cos 2\pi n f_0 t \quad (14)$$

On the other hand, other part of each input wave form is applied in a simlar way to the multiplier $M_2$, through the 90° phase shifters $P_1$ and $P_2$, and the output:

$$b_m \sin 2\pi m f_0 t \times C_n \sin 2\pi n f_0 t \quad (15)$$

is taken out. By adding differentially the two outputs of the multipliers $M_1$ and $M_2$ to the adder D, the wave form:

$$b_m C_n \cos 2\pi(m+n)f_0 t \quad (16)$$

namely, the wave form, of which the amplitude of the frequency component $(m+n)f_0$ is $b_m c_n$, is taken out from the output terminal $T_3$. Its operation is one of modulation, therefore, by introducing the wave forms, $K_0(y')$ and $K_0(-y')$, respectively to the input terminals $T_1$ and $T_2$, the wave form $$K_1(y'^2)$$

can be taken out by the use of this modulation. By representing modulator of FIG. 7b as X, and by connecting the same as $X_1$ in FIG. 7a, the wave form of $$K_1(y'^2)$$

is taken out at the output side thereof, and then be repeating the similar operation successively, the wave forms $$K_2(y'^{2^2}), K_3(y'^{2^3}) \ldots$$

are successively taken out at the outside of $X_2, X_3 \ldots$, and also the wave forms $$K_1(-y'^2), K_2(-y'^{2^2}) \ldots K_{N-1}(-y'^{2^{N-1}})$$

are taken out successively at the output side of the sign converters $C_2, C_3 \ldots C_N$. By making successively the wave form of the product of the wave forms $$K(-y'), K_1(-y'^2) \ldots$$

by using the computing circuits $X_{-1}, X_{-2} \ldots$, as shown in FIG. 7b, the impulse reponse of the inverse characteristic network is represented as output of $X-(N-1)$, in the form of frequency spectrum as in the following formula:

$$K'_0(t) = K(-y') K_1(-y'^2) \ldots K_{N-1}(-y'^{2^{N-1}})$$
$$\quad (11')$$

As afore-mentioned, the amplitude of such wave form is controlled by the automatic gain regulating circuit, and the frequency spectrum of such wave form voltage is produced by the function generator in the "device for making any desired frequency characteristic circuit" (see our co-pending patent application filed on August 29, 1955, Serial No. 531,237, and we can make an active inverse characteristic network having frequency characteristics $K_c(f)$.

As can be understood by the foregoing explanation, the transmission characteristics can be compensated, by cancelling the impulse response which is of even numbered position in the transmission system, then by cancelling the impulse response which is of even numbered position from the remaining impulse response after the first cancelling operation, thereby leaving the main component $Cm$ in Equation 9 and cancelling other extra components.

In FIGS. 8a, b, c, another embodiment of inverse characteristic network is shown as block diagram. It is already explained that, when the measuring pulses sent from the transmission side at every period $T_p$ are measured by the measuring circuit IV of FIG. 4 at every $$\frac{1}{2W}$$

second so that the impulse response $a_1$ is obtained, the frequency characteristics $K(f)$ of the transmission path at that time can be represented by the Formula 1. The power spectrum $|K(f)|^2$ of such transmission characteristic is represented by the product of $K(f)$ with its conjugate function, $K^*(f)$:

$$K^*(f) = a_0 + a_1 e^{j2\pi f \frac{1}{2W}} + \ldots a_L e^{j2\pi f \frac{L}{2W}} \quad (1'')$$

Namely, the product will be:

$$|K(f)|^2 = K(f) K^*(f) = R(0) + 2\sum_{i=1}^{L} R(i) \cos 2\pi f \frac{i}{2W}$$

$$= R(0)\left\{1 + \frac{2\sum_{i=1}^{L} R(i) \cos 2\pi f \frac{i}{2W}}{R(0)}\right\}$$

$$\quad (17)$$

where $$R(O) = \sum_{i=0}^{L} a_i^2, R(i) = \sum_{n=i}^{L} a_n a_{n-i}, i > 0$$

and from the Formula 2, $K_c(f)$ can be represented as:

$$K_c(f) = \frac{K^*(f) e^{-j2\pi f \tau}}{|K(f)|^2} \quad (18)$$

On the other hand, when put:

$$x = 2 \sum_{i=1}^{L} \frac{R(i)}{R(O)} \cos 2\pi f \frac{i}{2W} \quad (19)$$

the following formula is derived from the Formula 17:

$$|K(f)|^2 = R(O)(1+x) \quad (20)$$

and $$\frac{1}{|K(f)|^2}$$

will be expanded to the power series of $x$ as follows, due to the nature of correlation function, $|x| \leq 1$:

$$\frac{1}{|K(f)|^2} = \frac{1}{R(O)(1+x)} = \frac{1}{R(O)}(1-x+x^2-x^3+\ldots)$$

$$= \frac{1}{R(O)}(1-x)(1+x^2)(1+x^4)\ldots(1+x^{2^m})\left(\frac{1}{1-x^{2^{m+1}}}\right) \quad 25$$

$$(21)$$

When put:

$$\frac{1}{|K(f)|_m^2} = \frac{1}{R(O)}(1-x)(1+x^2)\ldots(1+x^{2^m}) \quad (22)$$

the following formula is derived from the Formula 20:

$$\frac{|K(f)|^2}{|K(f)|_m^2} = 1 - x^{2^{m+1}} \quad (23)$$

The larger the value of $m$ is taken, the more the value of $|K(f)|_m^2$ can be made approximate to $|K(f)|^2$, because the error is $x^{2^{m+1}}$.

Then, $|K(f)|^2$ in Formula 18 is substituted by $|K(f)|_m^2$ and $\tau$ is substituted by $$\frac{2m+1_L}{2W}$$

as follows:

$$K_c(f) = \frac{K^*(f) e^{-j2\pi f \frac{2^{m+1}L}{2W}}}{|K(f)|_m^2} \quad (24)$$

and $K_c(f)$ can be expanded as follows from the Formula 22:

$$K_c(f)$$

$$\doteq \frac{1}{R(O)} K^*(f) e^{-j2\pi f \frac{L}{2W}} (1-x) e^{-j2\pi f \frac{L}{2W}} \prod_{i=1}^{m}(1+x^{2^i}) e^{-j2\pi f \frac{2^i L}{2W}} \quad (25)$$

In the above formula, if $K^*(f)$ is substituted by the Formula 1'', $$\frac{1}{R(O)} K^*(f) e^{-j2\pi f \frac{L}{2W}}$$

$$= \frac{1}{R(O)}(a_0 e^{-j2\pi f \frac{L}{2W}} + a_1 e^{-j2\pi f \frac{L-1}{2W}} + \ldots + a_L)$$

$$(26)$$

is obtained and is represented by the equivalent circuit as in FIG. 8a. Also, from the Formula 20, $x$ will be:

$$x e^{-j2\pi f \frac{L}{2W}} = \frac{1}{R(O)} K(f) \cdot K^*(f) e^{-j2\pi f \frac{L}{2W}} - e^{-j2\pi f \frac{L}{2W}} \quad (27)$$

and is represented as equivalent circuit composed of $$K(f), K^*(f) e^{-j2\pi f \frac{L}{2W}}$$

and the delay circuit as in FIG. 8b. If the sampled impulse response $a_i$ is known, a circuit which satisfies either the Formula 26 or 27 can be made by FIGS. 8a and b. By representing the circuits of FIG. 8a and b by R and XA respectively, the equivalent circuit having frequency characteristics approximate to $K_c(f)$ to satisfy the Formula 25, namely the active inverse characteristic network V, can be made as in FIG. 8c and composed only of delay circuits and gain controllable amplifiers. There, R is a circuit which compensates for the phase characteristics, and the circuits succeeding thereto, which each is composed of XA and the delay circuit, are the circuit which compensate for the amplitude characteristics. It is also possible to connect the active inverse characteristic network shown in FIG. 5 as amplitude characteristic compensation circuit. Now, when the circuit of FIG. 8c, having frequency characteristics approximate to $K_c(f)$, is connected to the transmission path having frequency characteristics $K(f)$, the flat frequency characteristics of the delay time $$\frac{2m+1_L}{2W}$$

are obtained. And therefore, the input signal applied to the transmission path is taken out from the output side with a delay of $$\frac{2m+1_L}{2W}$$

second, without being deformed. The frequency characteristics $K(f)$ of the transmission path may be varied due to fading etc. However, by measuring the impulse response $a_i$ at every period $T_p$ by the measuring circuit IV of FIG. 4, and by controlling the amplification factor of each amplifier in FIG. 8a and b by the values of $a_i$, we can make the frequency characteristics $K_c(f)$ of the network of FIG. 8c satisfy always the Formula 2 in response to the variation of $K(f)$, and we can compensate automatically for the fading phenomenon etc.

By substituting $K^*(f)$ and $x$ by $a_i$, $K_c(f)$ in Formula 25 can be represented by:

$$K_c(f) = C_0 + C_1 e^{-j2\pi f \frac{1}{2W}} + C_2 e^{-j2\pi f \frac{2}{2W}} + \ldots + C_N e^{-j2\pi f \frac{LN}{2W}} \quad (28)$$

where $$N = 2^{m+1}$$

Therefore, by giving directly to the computer the sampled impulse response $a_i$ measured by the measuring circuit IV, by computing automatically the values of $C_0$, $C_1$, $C_2$ . . ., and by regulating automatically by such values the amplification factor of each amplifying circuit of network composed as in FIG. 1, as described above, we can also make the network V.

We can represent the sampled impulse response $a_i$ in the form of frequency spectrum as in FIG. 6, and represent the wave form thereof as real parts of the following formula:

$$K'(t) = a_0 + a_1 e^{-j2\pi f_0 t} + a_2 e^{-j2\pi f_0 t} + \ldots + a_L e^{-j2\pi L f_0 t} \quad (1')$$

As shown in FIG. 9, this wave form can be given by providing a group of the synchronising generators which are composed of sinusoidal generator of which frequencies are $f = 0, f_0, 2f_0, \ldots$, by giving to each amplifier A the amplification factor same as $a_0, a_1, a_2, \ldots a_L$, impulse response measured as afore-mentioned, and by superposing each output thereof. By multiplying the two output wave forms $K(t)$ taken out at the terminals of 1 and 1' by the computing circuit Y', we can take out $|K'(t)|^2$ at the terminal of 2:

$$|K(t)|^2 = R(O) + 2\sum_{i=1}^{L} R(i) \cos 2\pi i f_0 t \quad (17')$$

and we can obtain $R(O)$ and $R(i)$ in the Formula 17' respectively as D.C. component and A.C. component.

An example of the above computing circuit Y' is shown in FIG. 9b. When the wave forms, $b_m \cos 2\pi m f_0 t$ and $C_n \cos 2\pi n f_0 t$, are introduced respectively to the input terminals $T_1$ and $T_2$, one part each of the input wave forms is applied to the multiplier $M_1$ and the wave form in the form of the product of the two wave forms is taken out.

Other part is applied also to the multiplier $M_2$ in the form represented by $b_m \sin 2\pi m f_0 t$ and $C_n \sin 2\pi n f_0 t$ through each 90° phase shifters $P_1$ and $P_2$, and the wave form of the product of the two wave forms is taken out. Then, by adding the output wave forms of $M_1$ and $M_2$ at the adder AD, the output wave form, which has beat frequency of input signal applied to $T_1$ and $T_2$, represented by:

$$b_m C_n \cos 2\pi(m-n)f_0 t$$
$$= (b_m \cos 2\pi m f_0 t \times C_n \cos 2\pi n f_0 t + b_m \sin 2\pi m f_0 t \times C_n \sin 2\pi n f_0 t) \quad (29)$$

can be taken out at the output terminal $T_3$. Therefore, its operation is one of modulation. On the other hand, when the amplifier A′ is connected to each pulse generator of the group, $f=0, f_0, 2f_0 \ldots Lf_0$ and the amplification factor same as $a_L, a_{L-1}, \ldots a_2, a_1, a_0$, namely in the order counter to the case afore-mentioned, we can obtain, at the terminal 3, by superposing each output, the wave form voltage $$K'^*(t)e^{-2\pi Lf_0 t}$$

which is conjugate to $K'(t)$.

If the output of the terminal 3 is applied to the automatic gain control circuit $G_1$ (functioning in the same way as divider), and is controlled $R(O)$ which is taken out through the low pass filter LF from the output of the terminal 2, the output of 3 is divided by $R(O)$, and the wave form voltage represented by:

$$\frac{1}{R(O)}K'^*(t)e^{-2\pi Lf_0 t}$$

is obtained at the terminal 4. Also, by applying the output of the terminal 2 to the automatic gain control circuit $G_2$, and by controlling the same with the D.C. component $R(O)$ taken out through the low pass filter LF, we can take out at the terminal 5 the following wave form:

$$x' = 2\sum_{i=1}^{L} \frac{R(i)}{R(O)} \cos 2\pi i f_0 t \quad (19')$$

Such output wave form, together with the output wave form of $$e^{-j2\pi Lf_0 t}$$

applied directly from the generator $f=Lf_0$ to the terminal 6, are applied to the multiplier M.

$$x' e^{-j2\pi Lf_0 t}$$

is obtained at the terminal 7 thereby, converted into $$-x' e^{-j2\pi Lf_0 t}$$

through the phase inverter P, and $$e^{-j2\pi Lf_0 t}$$

from the terminal 6 is applied to the adder $AD_1$. Then, we can obtain at the terminal 8 the wave form voltage $$(1-x')e^{-j2\pi Lf_0 t}$$

Therefore, if the wave form voltage at the terminals 4 and 8 are applied to the computing circuit $X_0$ (FIG. 7b) for taking out the sum frequency, we can obtain at the terminal 9 the following wave form voltage:

$$\frac{1}{R(O)}K'^*(t)e^{-j2\pi Lf_0 t}(1-x')e^{-j2\pi Lf_0 t}$$

Thereafter, the wave form voltage, $$x' e^{-j2\pi Lf_0 t}$$

at the terminal 7, is divided in two, and is added to the computing circuit $X_1$ for taking out the sum frequency.

$$x'^2 e^{-j2\pi 2Lf_0 t}$$

is taken out at the terminal 10, to which $$e^{-j2\pi 2Lf_0 t}$$

$$(e^{-j2\pi 2Lf_0 t}$$

is the wave form voltage taken out at the terminal 6, of which the frequency $f=Lf_0$ has been doubled through the frequency doubler $H_1$) is added at the adder $AD_2$, and the wave form $$(1+x'^2)e^{-j\pi 2Lf_0 t}$$

(see Formula 25) is obtained at the terminal 11.

Such wave form voltage is applied to the computing circuit $X_1$, together with the wave form voltage of the terminal 9, and $$\frac{1}{R(O)}K'^*(t)e^{-j2\pi Lf_0 t}(1-x')e^{-j2\pi Lf_0 t}(1+x'^2)e^{-j2\pi 2Lf_0 t}$$

(see Formula 25) is taken out. By repeating the same operation, we can take out the voltage wave form:

$$K'^*_0(t)$$
$$\doteq \frac{1}{R(O)}K^*(t)e^{-j2\pi Lf_0 t}(1-x')e^{-j2\pi Lf_0 t}\prod_{i=1}^{m}(1+x'^2)^i e^{-j2\pi 2iLf_0 t}$$

(25′)

which corresponds to the Formula 25, as output of the computing circuit $X_m$. By producing such voltage wave form by the "device for making any desired frequency characteristic circuit," subject matter of our co-pending application for patent filed on August 29, 1955, Serial No. 531,237, we can make an active inverse characteristic network having frequency characteristics $K_c(f)$.

As explained above, the main component of impulse response of transmission system is converted to a simpler form as in Equation 20, by the phase characteristic compensation circuit having frequency characteristics conjugate with the transmission characteristics, and then the extra components of $$-x+x^3- \ldots \text{ of } \frac{1}{1+x} = 1-x+x^3- \ldots$$

are cancelled as in Equations 21 and 22. By doing so, the main component can be placed at a definite position, namely the position of delay time of $$\frac{2^{m+1}L}{2W}$$

and this is exactly the characteristic of our invention.

To make the explanation simpler, the above description was made by taking $a_i$ as sampled impulse response at at every $$\frac{1}{2W}$$

second. Actually, it is better to sample at an interval smaller than $$\frac{1}{2W}$$

second for measuring the frequency characteristics more precisely. The compensation for transmission characteristics can also be made more precisely. As is clear from the Formula 9, in the active inverse characteristic network, the error will be large when the absolute value of $y_1, y_2 \ldots Y_L$, L roots, is near to 1, in case $K(f)$ is represented by $K(y)$ in Formula 4; but, the larger N is taken, the smaller such error can be made. Also, it is clear from the Formula 23 that the error, $$x^{2^{m-1}}$$

occurs; but, since $|x| \leq 1$, the larger $m$ is taken, the smaller such error can be made.

The above explanation was made for the method of active inverse characteristic network, in case pulses having larger periods than the duration of time T of the impulse response are used as measuring signal.

We shall explain hereunder the case in which is used measuring signal combined by the signal of the frequency which is smaller than 1/T and the higher harmonics thereof. The measuring signal line spectrum, having successively frequency interval $f_p$ starting from carrier frequency $f_0$ and having constant intensity $E_1$ as shown in FIG. 10a, to satisfy the condition:

$$f_p < \frac{1}{T} \quad (30)$$

is sent from the transmission side. This is done by the method such as modulating the carrier frequency $f_0$ by pulses of period $1/f_p$. At the receiving side, such measuring signal line spectrum is demodulated. Assuming that $A_0, A_1, A_2, \ldots A_m \ldots A_M$ are obtained as received voltages at each frequency $f_0, f_0+f_p, f_0+2f_p \ldots f_0+mf_p \ldots f_0+Mf_p$ as shown in FIG. 10b. By connecting each peak value thereof as shown in broken line, we can know the frequency characteristics $K(f)$ of the transmission system, and such frequency characteristics are represented by the following formula ($f_0$ being frequency origin):

$$K(f) = \sum_m A_m \frac{\sin \pi\left(\frac{f}{f_p} - m\right)}{\pi\left(\frac{f}{f_p} - m\right)} \quad (31)$$

In the above case, $A_m$ generally includes the phase characteristics, and therefore is complex quantity. Therefore, $A_m = a_m + j a'_m$, and each component of $A_m$, different by 90°, is to be measured separately. However, in order to make the explanation simpler, we shall treat the same as real.

Generally, in order to obtain the flat frequency characteristics by compensating for the transmission characteristics $K(f)$, represented by the Formula 31, a circuit is made which has the inverse characteristic as shown in broken line in FIG. 10c. The said circuit which is inversely proportional to $K(f)$ can be represented by the formula: in case T', the duration of time of the impulse response of inverse characteristic network is smaller than T:

$$\frac{\alpha}{K(f)} = \sum_m \frac{\alpha}{A_m} \frac{\sin \pi\left(\frac{f}{f_p} - m\right)}{\pi\left(\frac{f}{f_p} - m\right)} \quad (32)$$

where $\alpha$ is constant, and the circuit is connected in cascade to the transmission system of the characteristics $K(f)$. Then, the frequency characteristics as a whole are represented by $$K(f) \times \frac{\alpha}{K(f)} = \alpha$$

This means that the system has flat characteristics, and in the transmission band width, all the frequency components of signal sent are taken out by being multiplied by $\alpha$. (When $\alpha=1$, the received voltage is equal to the signal voltage of the transmission side.)

The method for making the inverse characteristic network having the frequency characteristics $\alpha/K(f)$ represented by the Formula 32 is described hereunder on one embodiment shown in FIG. 11. As described above, the measuring signal having constant amplitude, sent from the transmitter TR and at every constant frequency interval $f_p$, starting from $f_0$, is received at the receiver RE through the transmission characteristics $K(f)$. The received output is applied to each amplifier $AM_0, AM_1, \ldots AM_m, \ldots AM_M$, through each filter, $F_0, F_1, \ldots F_m, \ldots F_M$ having frequency characteristics approximate to:

$$\frac{\sin \pi\left(\frac{f}{f_p} - m\right)}{\pi\left(\frac{f}{f_p} - m\right)} \quad (33)$$

The above filters are made by Shannon's filter, substituting $m$ in Formula 33 by positive integer, 0, 1, 2, ... and taking central frequency respectively as $f_0, f_0+f_p \ldots f_0+mf_p \ldots f_0+Mf_p$. The above filters can be made also approximately by filters having orthogonal frequency characteristics. On the other hand, one part of the received output of RE is impressed on demodulators $D_0, D_1, \ldots D_m \ldots D_M$. The output of oscillators $O_0$ and $O_p$ of frequency $f_0$ and $f_p$ is impressed on harmonic generator HG, and the output thereof having constant amplitude and frequencies $f_0, f_0+f_p, \ldots f_0+mf_p, \ldots f_0+Mf_p$ is also impressed on the above demodulators. From the low pass filter LF connected to each demodulator, the D.C. output corresponding to the amplitude $A_0, A_1, \ldots A_m, \ldots A_M$ of the line spectrum shown in solid line in FIG. 10b is taken out, and the amplification factor A of each amplifier $AM_0, AM_1, \ldots AM_m, \ldots AM_M$ is controlled thereby so that A will be $$\frac{\alpha}{A_0} \frac{\alpha}{A_1} \cdots \frac{\alpha}{A_m} \cdots \frac{\alpha}{A_M}$$

Then, the circuit made by connecting in series the filters $F_0, F_1 \ldots F_m \ldots F_M$ and the amplifiers $AM_0, AM_1 \ldots AM_m \ldots AM_M$ has the frequency characteristics $\alpha/K(f)$ shown in broken line in FIG. 10c, which satisfies the Formula 32.

Therefore, signal deformed in the transmission system of the frequency characteristics $K(f)$ shown in FIG. 10b and is received by the receiver RE, is compensated for by the circuit having the characteristics $\alpha/\bar{K}/f$ above-mentioned, and is taken out from the output terminal $t$. In such case, the measuring signal sent at interval $f_p$, together with information signal, appear also at the output terminal. However, since the measuring signal exists as line spectrum of extremely narrow band width of constant interval, we can remove the same by a band elimination filter of narrow band width, without damaging the quality. Also, since the measuring signal, after passing through the inverse characteristic network, is restored to its original line spectrum with constant amplitude, we can cancel the same by using reverse signals having the same frequency interval.

Figure 13B:
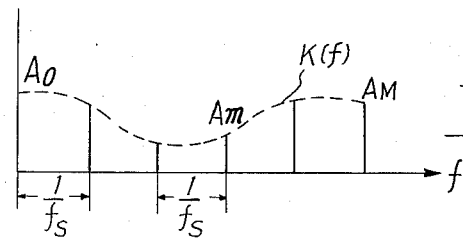
Figure 13C:
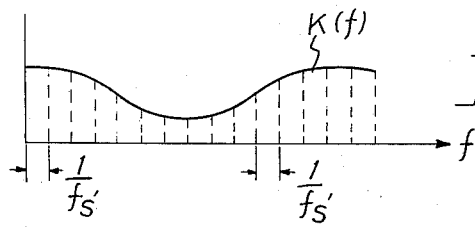
Figure 13D:
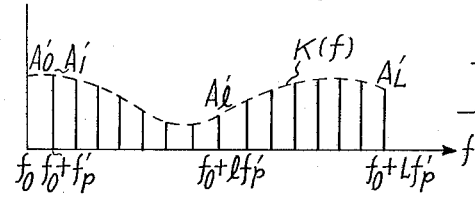
Figure 13E:
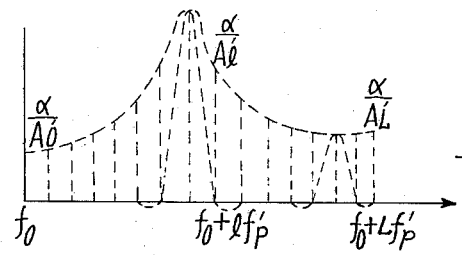

The above description is only applicable to the case where $f_p$ in the Formula 32 satisfies the conditions of the Formula 30 and also the following formula:

$$f_p < \frac{1}{T'} \quad (34)$$

to the duration of time T', of the impulse response of the circuit of the frequency characteristics $\alpha/K(f)$. However, when $f_p$ does not satisfy the above Formula 34, we have only to select $f_p$ in advance to satisfy the Formulas 30 and 34 and to fix the frequency interval of the measuring signal. In case T' of the inverse characteristic network of $\alpha/K(f)$ is larger than T of the transmission path of $K(f)$, we can use the following method:

From the transmitter TR of FIG. 12, the measuring signal is sent out at every interval $f_p$ which satisfies the Formula 30. Such measuring signal is received at the receiver RE after having passed through the transmission path of the transmission characteristics $K(f)$, and is applied to the measuring apparatus D (which includes demodulators $D_0 \ldots D_m \ldots D_M$, harmonic generator HG, oscillators $O_0, O_p$ and the low pass filters LF in FIG. 11). The D.C. output, equal to the amplitude of line spectrum, is taken out as shown in solid line in FIG. 13a. In order to convert the frequency characteristics of FIG. 13a to time series as in FIG. 13b, each D.C. output of D is led in the sampling circuit $S_1$ which is controlled by the output of oscillator $O_{s1}$, and $A_0$, $A_1 \ldots A_m \ldots A_M$ are taken out successively at the repeating period of $1/f_s$, and are applied to the low pass filter LPF. At the output side of LPF, a characteristic curve same as the characteristics $K(f)$ shown in FIG. 10b in broken line is obtained as continuous voltage wave form with time. The output voltage of LPF is again applied to the sampling circuit $S_2$ which is controlled by the output of the oscillator $O_{s2}$, sampled at the repeating period of $f_s'$ $$(f_s/f_s' > T/T')$$

where $$f_D' < \frac{1}{T'}$$

and by taking out successively the voltages of $A_0'$, $A_1' \ldots A_l' \ldots A_L'$, we can deem such voltages as values of interpolation of characteristic curve $K(f)$ in FIG. 13a, sampled at every frequency interval $f_D'$ as in FIG. 13d. It is therefore possible to represent $K(f)$ in the Formula 31 as:

$$K(f) = \sum_e A_e' \frac{\sin\pi\left(\frac{f}{f_D'} - e\right)}{\pi\left(\frac{f}{f_D'} - e\right)} \quad (31')$$

and, in order to compensate for such characteristics, we have only to make a network having inverse characteristics shown in FIG. 13e in broken line which is represented by the formula:

$$\frac{\alpha}{K(f)} = \sum_e \frac{\alpha}{A_e'} \frac{\sin\pi\left(\frac{f}{f_D'} - e\right)}{\pi\left(\frac{f}{f_D'} - e\right)} \quad (32')$$

and to connect the same to the receiver. Therefore, it is possible to make an inverse characteristic network which satisfies $$f_D' < \frac{1}{T'}$$

by connecting in series filters, $F_0, F_1 \ldots F_l \ldots F_L$, having frequency characteristics:

$$\frac{\sin\pi\left(\frac{f}{f_D'} - e\right)}{\pi\left(\frac{f}{f_D'} - e\right)} \quad (33')$$

and amplifiers $AM_0, AM_1 \ldots AM_l \ldots AM_L$ of which the amplification factor is controlled to $$\frac{1}{A_l'}$$

by the output $A_0', A_1' \ldots A_l' \ldots A_L'$ taken out from $S_2$.

As explained above, by varying gain of controllable amplifier series-connected to filter of respective frequency, the impulse response which corresponds to delay of phase relation having the largest energy is made main component, and other extra components are cancelled.

The above description was made mainly with reference to cases in which the transmission characteristics of the transmission system are varied with time. In case where the transmission characteristics are not varied with time, the transmission characteristics are measured first, and then, by the values measured, the frequency characteristics of the active inverse characteristic network are controlled, and the measuring circuit can be removed, after having been fixed at such state.

Also, the active inverse characteristic network can be connected in cascade at the transmission side to the transmission system. In such case, the values measured at the receiving side are sent back to the transmission side to control the active inverse characteristic network connected to the transmission side.

We claim:

1. A transmission frequency characteristic compensation system, having, at the transmission side of the transmission path, means for generating measuring pulses, and at the receiving side of the transmission path, means for receiving said measuring pulses, said measuring pulses being sent out at every period $Tp$ from said means for generating measuring pulses for measuring transmission frequency characteristics, being received at said receiving side as wave form thereof after being deformed by said transmission frequency characteristics, and then being measured as sampled values of impulse response of said transmission path by a sampling pulse generator synchonized at $Tp$ and gate circuits, said sampling pulse generator and said gate circuits sampling said wave form at every sampling time $$\frac{1}{2W}$$

defined by $W$ which is larger than bandwidth of said transmission path, and obtaining as voltages components $a_0, a_1, a_2 \ldots a_l \ldots a_L$ of the sampled value of said received wave form of measuring pulses, characterized in that the system is provided with a network which is connected in cascade to said transmission path and which comprises a plurality of series-connected circuits, each of said series-connected circuits being composed of controllable amplifiers having each an amplification factor equal to said voltage components $a_0, a_1, a_2 \ldots a_l \ldots a_L$ and delay circuits each having a delay time corresponding to an integer multiple of said sampling time $$\frac{1}{2W}$$

the first of said series-connected circuits, nearest to said transmission path, intensifying one of said voltage components having the maximum energy of said sampled value of impulse response produced in said transmission path and attenuating all remaining of said voltage components, by controlling said amplification factor of said controllable amplifiers, whereby the energy ratio of the voltage component having the maximum energy up to the output of said first series-connected circuit and said remaining voltage components is made larger than at the input of said first series-connected circuit, the succeeding series-connected circuits each intensifying said voltage component having the maximum energy up to the output of the immediately preceding series-connected circuit and attenuating said remaining voltage components, whereby the energy ratio of said voltage component having the maximum energy up to the output of the immediately preceding series-connected circuit and said remaining voltage components is made larger and larger, said operation being repeated, whereby impulse response produced in said transmission path and said network has a non-zero value at a delay time corresponding to an integar multiple of said sampling time and has a value substantially zero at other times than said delay time, and the frequency characteristics of said network are inverse to the transmission frequency characteristics of said transmission path.

2. A transmission frequency characteristic compensation system as set forth in claim 1 wherein said network is connected in cascade to said transmission path at said receiving side.

3. A transmission frequency characteristic compensation system as set forth in claim 1, wherein said network is connected in cascade to said transmission path at said transmission side, and said voltage components $a_0, a_1, a_2 \ldots a_l \ldots a_L$ are sent back to said transmission side, whereby the frequency characteristics of said network are made inverse to the transmission frequency characteristics of said transmission path.

4. A transmission frequency characteristic compensation system as set forth in claim 1 which has as least one circuit composed of series connected circuits, each of said series connected circuits comprising one of said controllable amplifiers having an amplification factor equal to said voltage component $a_i$ and one of said delay circuits having delay time $$\frac{L-i}{2W}$$

where $i$ equals one of the figures $0 \ldots i \ldots L$, and said series-connected circuits are connected in parallel to form said one circuit.

5. A transmission frequency characteristic compensation system as set forth in claim 1 wherein said plurality of series-connected circuits each comprises one of said controllable amplifiers and one of said delay circuits, and is further provided with a computing circuit composed of at least one sinusoidal generator, at least one modulator and at least one multipler, to which said $a_0, a_1, a_2 \ldots a_i \ldots a_L$ is applied as input, and the output of said computing circuit is applied to one of said controllable amplifiers.

6. A transmission frequency characteristic compensation system, as set forth in claim 1, wherein each of said series-connected circuits is further provided with a band-pass filter, said series-connected circuits being connected in parallel to form said network, and said network is further provided with a spectrum analyzer to which said $a_0, a_1, a_2 \ldots a_i \ldots a_L$ is applied as input, and the output of said spectrum analyzer is applied to one of said controllable amplifiers.

References Cited in the file of this patent

UNITED STATES PATENTS

| | | |
|---|---|---|
| 2,617,855 | Etheridge | Nov. 11, 1952 |
| 2,677,015 | Hausman | Apr. 27, 1954 |
| 2,707,209 | Ambrosio | Apr. 26, 1955 |
| 2,753,547 | Donath et al. | July 3, 1956 |
| 2,758,281 | Carleson | Aug. 7, 1956 |